United States Patent
Lim

(10) Patent No.: US 12,001,632 B2
(45) Date of Patent: Jun. 4, 2024

(54) TOUCH SENSING DEVICE AND TOUCH SENSING METHOD

(71) Applicant: LX Semicon Co., Ltd., Daejeon (KR)

(72) Inventor: Yang Been Lim, Daejeon (KR)

(73) Assignee: LX SEMICON CO., LTD., Daejeon (KR)

(*) Notice: Subject to any disclaimer, the term of this patent is extended or adjusted under 35 U.S.C. 154(b) by 18 days.

(21) Appl. No.: 18/078,709

(22) Filed: Dec. 9, 2022

(65) Prior Publication Data

US 2023/0195258 A1 Jun. 22, 2023

(30) Foreign Application Priority Data

Dec. 21, 2021 (KR) .................. 10-2021-0183396

(51) Int. Cl.
*G06F 3/041* (2006.01)
(52) U.S. Cl.
CPC .......... *G06F 3/0418* (2013.01); *G06F 3/0414* (2013.01)

(58) Field of Classification Search
CPC .. G06F 3/0418; G06F 3/0414; G06F 3/04186; G06F 3/0446; G06F 3/0416
See application file for complete search history.

(56) References Cited

U.S. PATENT DOCUMENTS

| | | | |
|---|---|---|---|
| 9,207,820 B2 | 12/2015 | Lamont et al. | |
| 9,891,747 B2 | 2/2018 | Jang et al. | |
| 2012/0182228 A1* | 7/2012 | Liu | G06F 3/0416 345/173 |
| 2017/0060338 A1* | 3/2017 | Nakajima | G06F 3/04883 |
| 2023/0104048 A1* | 4/2023 | Kitagawa | G06F 3/04166 345/178 |

FOREIGN PATENT DOCUMENTS

KR 101994108 B1 7/2019

* cited by examiner

*Primary Examiner* — Hong Zhou
(74) *Attorney, Agent, or Firm* — POLSINELLI PC

(57) ABSTRACT

The present disclosure relates to a touch sensing device and a touch sensing method, and more particularly, to a touch sensing device and a touch sensing method to prevent a tracking error of touch coordinates.

12 Claims, 10 Drawing Sheets

1st sensing frame

2nd sensing frame

3rd sensing frame

10A

10B

TOUCH SENSING DEVICE AND TOUCH SENSING METHOD

CROSS REFERENCE TO RELATED APPLICATION

This application claims priority to Republic of Korea Patent Application No. 10-2021-0183396 filed on Dec. 21, 2021, which is hereby incorporated by reference in its entirety.

BACKGROUND

1. Field of Technology

The exemplary embodiment relates to a touch sensing device and a touch sensing method.

2. Related Technology

As the informatization society develops, the demand for display devices for displaying an image is increasing in various forms. As a result, various types of display devices such as a liquid crystal display device (LCD) or an organic light emitting display device (OLED) are used.

In recent years, a display device having a touch screen that can detect a touch input of a user by a user's finger or touch pen has been widely used by getting out of a normal input scheme such as a button, a keyboard, a mouse, etc. The display device includes a touch sensing device for detecting whether a touch is made and touch coordinates (touch position).

Here, the user's touch on the touch screen is commonly sensed discontinuously (e.g., sensed by the unit of a frame). Therefore, as illustrated in FIG. 8, in order to a touch sensing device to recognize a drawing touch in which the user draws a line on the touch screen, touch coordinates of a touch sensed in a previous and touch coordinates of a touch sensed in a next frame should be associated with each other.

An existing touch sensing device therefor assigns the same touch identity (ID) to the touch coordinates corresponding to the drawing touch illustrated in FIG. 8 and associate the touch coordinates.

For example, the touch sensing device assigns a first touch ID to first touch coordinates (C1 in FIG. 8) of a first touch sensed in a first sensing frame ($1^{st}$ sensing frame in FIG. 8) which is a first time point when the user's touch is started. In addition, the touch sensing device identifies a first distance (d1 in FIG. 8) which is a distance between second touch coordinates (C2 in FIG. 8) of a second touch sensed in a second sensing frame ($2^{nd}$ sensing frame in FIG. 8) which is a second time point, and the first touch coordinate. When the first distance is smaller than a predetermined threshold value ($D_{tv}$ in FIG. 8), the touch sensing device assigns the first touch ID even to the second touch coordinates C2.

When a second distance (d2 in FIG. 8) which is a distance between a third touch coordinates (C3 in FIG. 8) and the second touch coordinates is smaller than the threshold value Dt even for the third touch coordinates (C3 in FIG. 8), the first touch ID is assigned even to the third touch coordinates C3. Here, the threshold value Dt may be a reference distance value between coordinates for determining whether the touch sensing device is to assign the same touch ID to two coordinates.

When the touch sensing device assigns the first touch ID equally to the first to third touch coordinates corresponding to the drawing touch as such, a line connecting the first to third touch coordinates may be displayed on a screen of the display device as in reference numeral 10A of FIG. 10.

Meanwhile, for a drum touch in which the user tap-touches a part (representation of a dotted line in FIG. 9) of the touch screen several times, the touch sensing device assigns different touch IDs to touch coordinates corresponding to the drum touch. Through this, an event which meets the drum touch is displayed (e.g., dot displayed) on the screen of the display device.

However, when the distance between the touch coordinates corresponding to the drum touch is equal to or less than the threshold value Dt, the existing touch sensing device assigns the first touch ID equally to the first touch coordinates (C1 in FIG. 9) to the third touch coordinates (C3 in FIG. 9) corresponding to the drum touch, and as a result, a tracking error in which the line connecting the first to third touch coordinates is displayed on the screen of the display device as in reference numeral 10B in FIG. 10 occurs.

The discussions in this section are only to provide background information and does not constitute an admission of prior art.

SUMMARY

In such a background, an aspect of the present disclosure is to provide technology that prevents a tracking error of touch coordinates in an aspect.

To this end, in an aspect, the present disclosure provides a touch sensing device comprising: a touch coordinate calculation circuit to calculate first touch coordinates for a touch input detected by touch electrodes at a first time point, to calculate second touch coordinates for a touch input detected by touch electrodes at a second time point, and to calculate third touch coordinates for a touch input detected by the touch electrodes at a third time point; and a touch coordinate tracking circuit to assign a first touch ID to the first touch coordinates, to identify a first distance which is a distance between the first touch coordinates and the second touch coordinate, to assign the first touch ID to the second touch coordinates as well when the first distance is smaller than a first threshold value, to identify a second distance which is a distance between the second touch coordinates and the third touch coordinate, to determine a touch ID to be assigned to the third touch coordinates by using a first vector for the first and second touch coordinates and a second vector for the second and third touch coordinates when the second distance is smaller than the first threshold value, and to assign the determined touch ID to the third touch coordinates.

In another aspect, the present disclosure provides a touch sensing method comprising: calculating first touch coordinates for a touch input detected by touch electrodes at a first time point and assigning a first touch ID to the first touch coordinates; calculating second touch coordinates for the touch input detected by the touch electrodes at a second time point and identifying a first distance which is a distance between the first touch coordinates and the second touch coordinates; assigning the first touch ID to the second touch coordinates as well when the first distance is smaller than the first threshold value by comparing the first distance and a first threshold value; calculating third touch coordinates for a touch input detected by the touch electrodes at a third time point and identifying a second distance which is a distance between the second touch coordinates and the third touch coordinates; and determining a touch ID to be assigned to the third touch coordinates by using a first vector for the first and second touch coordinates and a second vector for the second and third touch coordinates when the second distance is smaller than the first threshold value by comparing the second distance and the first threshold value and assigning the determined touch ID to the third touch coordinates.

In assigning the first touch ID to the second touch coordinates as well, the touch sensing device may further compare a second threshold value, which is smaller than the first threshold value, and the first distance when the first distance is smaller than the first threshold value; and assign the first touch ID to the second touch coordinates as well when the first distance is smaller than the first threshold value and greater than the second threshold value.

As described above, according to the exemplary embodiment, even when a distance between touch coordinates corresponding to a drum touch is within a first threshold value, different touch IDs can be assigned to respective touch coordinates, so it is possible to prevent a tracking error from occurring in the drum touch in which the distance between the touch coordinates is within the first threshold value.

DETAILED DESCRIPTION OF EMBODIMENTS

Figure 1:
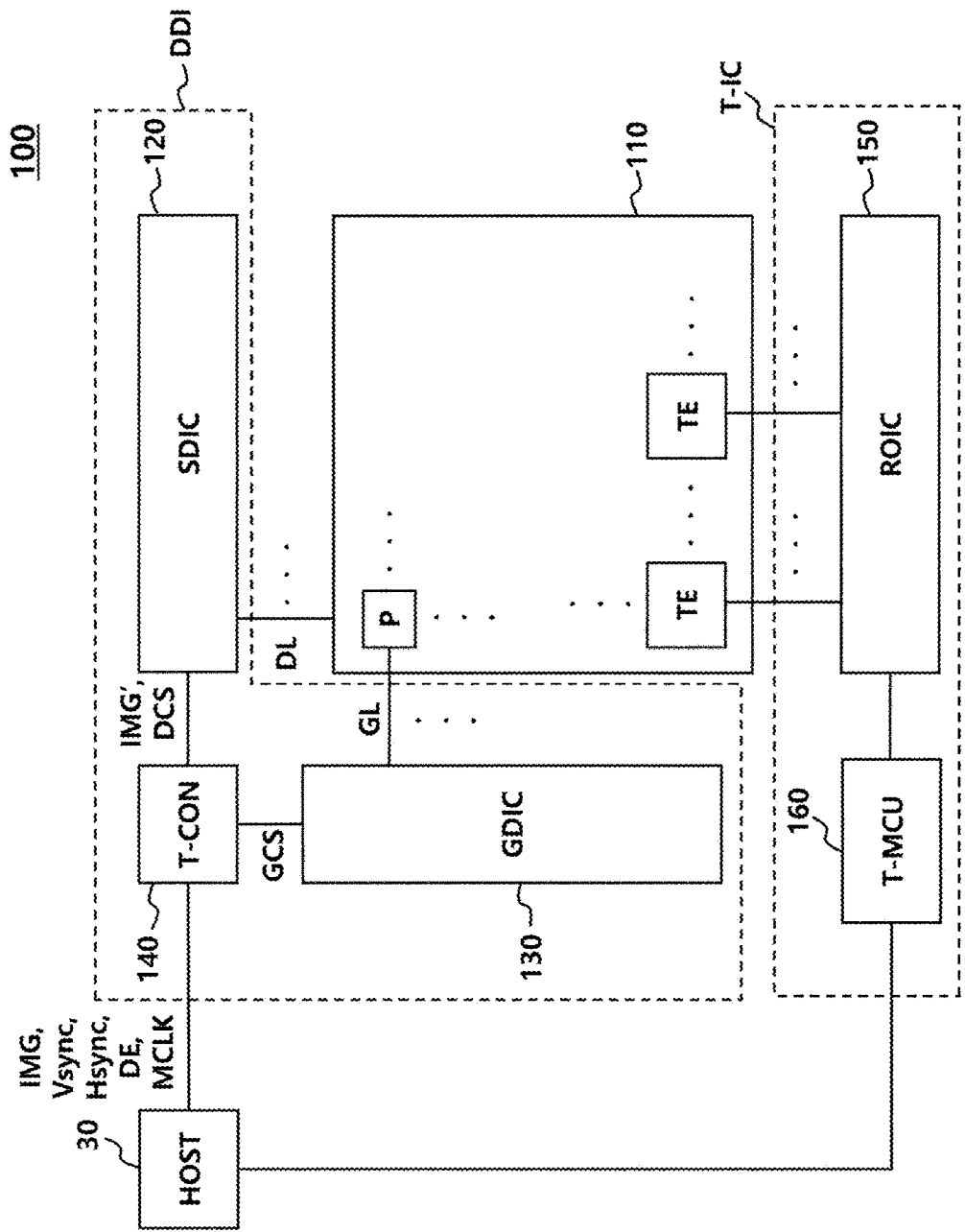
FIG. 1 is a configuration diagram of a display device according to an exemplary embodiment.

FIG. 1 is a configuration diagram of a display device according to an exemplary embodiment.

Referring to FIG. 1, the display device 100 may include a panel 110, a source driver integrated circuit (SDIC) 120, a gate driver integrated circuit (GDIC) 130, a timing controller (T-CON) 140, a readout integrated circuit (ROIC) 150, and a touch micro controller unit (T-MCU) 160.

Here, at least one of the SDIC 120, the GDIC 130, and the T-CON 140 may be included in one integrated circuit. The integrated circuit may be referred to as display driver IC (DDI).

Further, the ROIC 150 and the T-MCU 160 may also be included in one integrated circuit. The integrated circuit may be referred to as touch integrated circuit (T-IC).

In FIG. 1, it is illustrated that the SDIC 120 and the ROIC 150 are separated from each other, but the SDIC 120 and the ROIC 150 may also be included in one integrated circuit. The integrated circuit may be referred to as source read integrated circuit (SRIC).

In an embodiment, the T-MCU 160 may be referred to as a touch sensing device. The T-IC including the ROIC 150 and the T-MCU 160 may also be referred to as the touch sensing device.

The SDIC 120 may drive a data line DL connected to a pixel P, and the GDIC 130 may drive a gate line GL connected to the pixel P. In addition, the T-CON 140 may drive a touch electrode TE disposed in a panel 110.

In the panel, multiple data lines DL and multiple gate lines GL may be disposed, and multiple pixels P may be disposed.

In addition, multiple touch electrodes TE may be disposed in the panel 110.

In other words, the panel 110 may include a display panel, and further include a touch screen panel (TSP). Here, the display panel and the TSP may share some components. For example, the touch electrodes TE of the TSP may be used as a common electrode in which common electrode voltage is supplied in the display panel.

The SDIC 120 may supply data voltage to the data line DL in order to display an image in each pixel P of the panel 110. The SDIC may include at least one data driver integrated circuit, and at least one data driver integrated circuit may be connected to a bonding pad of the panel 110 by a tape automated bonding (TAB) scheme or a chip on glass (COG) scheme, or also directly formed in the panel 110. In some cases, at least one data driver integrated circuit may also be integrated and formed in the panel 110. Further, the SDIC 120 may be implemented by a chip on film (COF) scheme.

The SDIC 120 may receive image data IMG' and a data control signal DCS from the T-CON 140. The SDIC 120 may generate data voltage according to a greyscale value of each pixel indicated by the image data, and drive each pixel.

The data control signal DCS may include at least one synchronization signal. For example, the data control signal DCS may include a vertical synchronization signal VSYNC, a horizontal synchronization signal HSYNC, a time division signal, etc.

The SDIC 120 may distinguish the frame according to the vertical synchronization signal VSYNC, and drive each pixel in an interval other than a vertical blank interval indicated by the vertical synchronization signal VSYNC. The SDIC 120 may identify image data for each horizontal line according to the horizontal synchronization signal HSYNC, and supply the data voltage for each horizontal line.

Figure 2:
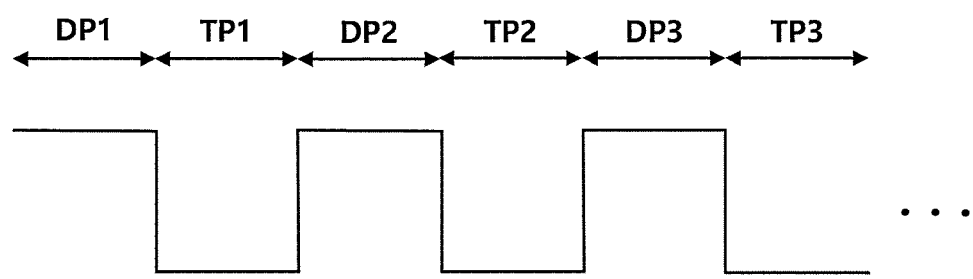
FIG. 2 is a diagram for describing a time division driving scheme of the display device according to an exemplary embodiment.

The SDIC 120 may distinguish a display driving period DP and a touch driving period TP according to the time division signal as in FIG. 2, and drive each pixel within the display driving period DP.

Here, a period corresponding to one frame may include one display driving period DP and one touch driving period TP. In other words, a first frame period may include a first display driving period DP1 and a first touch driving period TP1, and a second frame period may include a second display driving period DP2 and a second touch driving period TP2. In addition, a third period may include a third display driving period DP3 and a third touch driving period TP3.

The GDIC 130 may supply a scan signal to the gate line GL in order to turn on and off a transistor located in each pixel P. The GDIC 130 may also be located only at one side of the panel 110 as in FIG. 1, and also divided into two and located at both sides of the panel 110 according to the driving scheme. Further, the GDIC 130 may include at least one gate driver integrated circuit, and at least one gate driver integrated circuit may be connected to the bonding pad of the panel 110 by the tape automated bonding (TAB) scheme or the chip on glass (COG) scheme, or also implemented as a gate in panel (GIP) type and directly formed in the panel 110. In some cases, at least one gate driver integrated circuit may also be integrated and formed in the panel 110. Further, the GDIC 130 may be implemented by the chip on film (COF) scheme.

The GDIC 130 may receive the gate control signal GCS from the T-CON 140. The gate control signal GCS may include a plurality of clock signals. In addition, the GDIC 130 may generate the scan signal by using the clock signal, and supply the scan signal to the gate line GL.

The T-CON 140 is input with timing signals such as a vertical synchronization signal Vsync, a horizontal synchronization signal Hsync, a data enable signal Data Enable, a main clock MCLK, etc., input from a host 30 to synchronize operation timings of the SDIC 120 and the GDIC 130.

Further, the T-CON 140 may receive image data IMG from the host 30, and converts the image signal IMG into the image data IMG' of a type processible by the SDIC 120. The T-CON may output the converted image data IMG' to the SDIC 120.

The ROIC 150 may supply a touch driving signal Tx to the touch electrodes TE during the touch driving period TP (in FIG. 2), and receive a reaction signal Rx from the touch electrodes TE.

The ROIC 150 may generate raw data based on the received reaction signal Rx. In addition, the ROIC may transmit the raw data to the T-MCU 160.

The T-MCU 160 may calculate a touch coordinates based on the raw data.

In other words, the T-MCU 160 may calculate the touch coordinates for a touch input detected from the touch electrode TE.

The T-MCU 160 may track a relationship between the touch coordinates by assigning a touch identity (ID) to the calculated touch coordinate.

Figure 8:
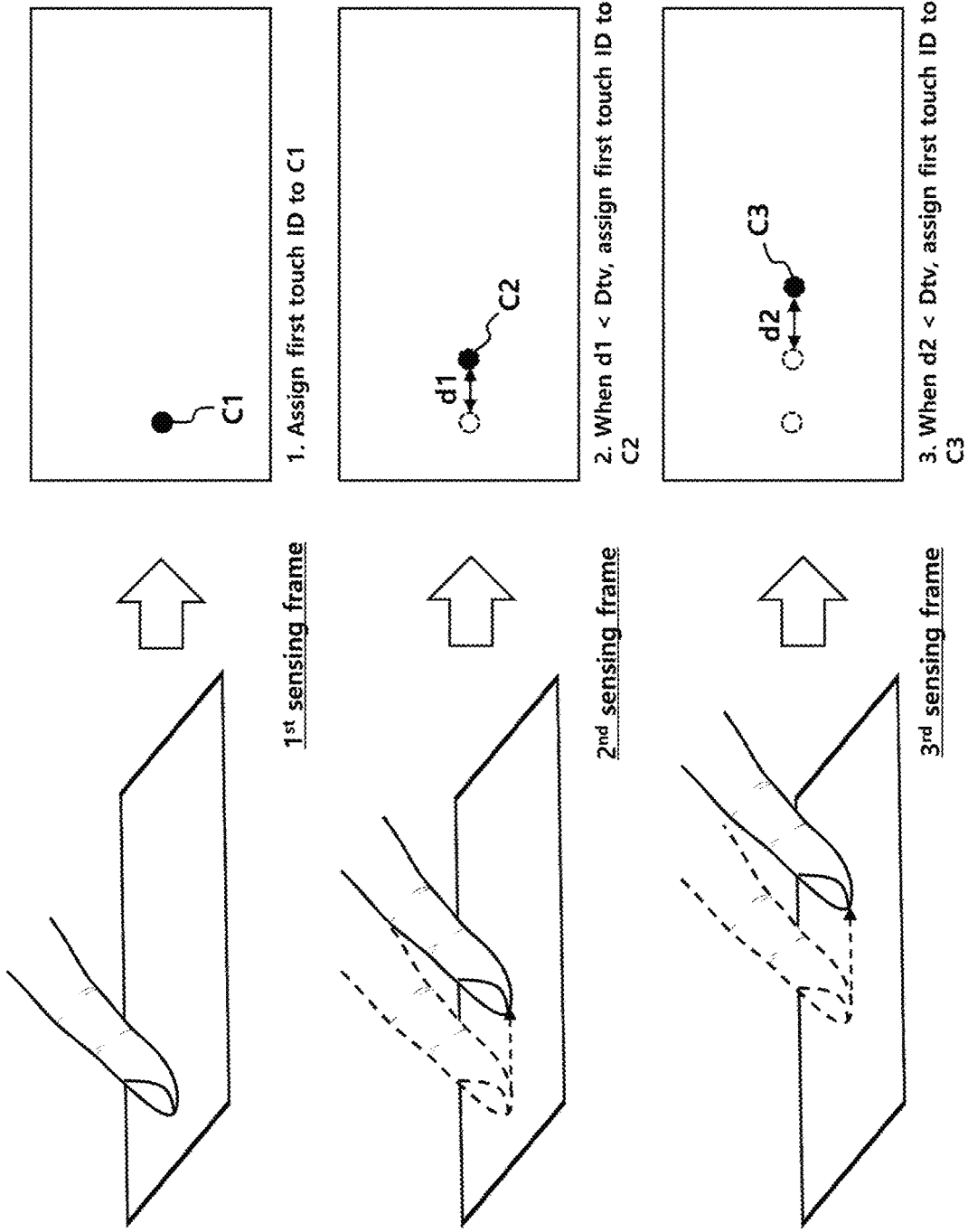
FIG. 8 is a diagram for describing a drawing touch.
Figure 9:
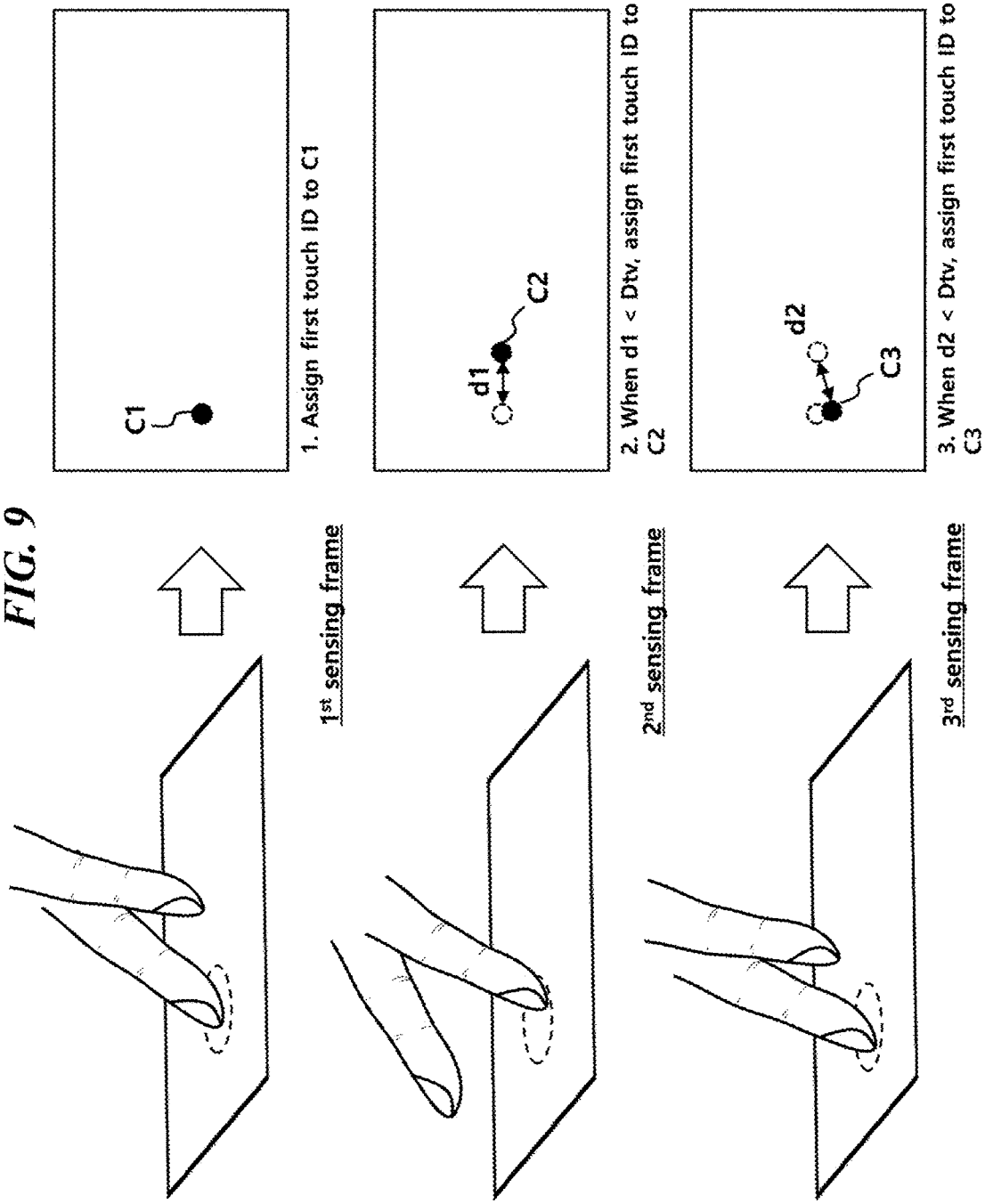
FIG. 9 is a diagram for describing a case where a tracking error occurs in a drum touch.
Figure 10:
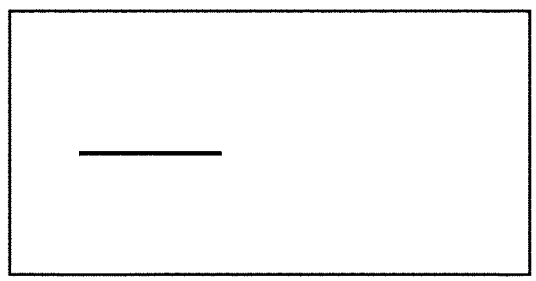
FIG. 10 is a diagram exemplarily illustrating a screen displaying the drawing touch and a screen displaying the drum touch in which the tracking error occurs.
Figure 10:

In general, the T-MCU 160 may assign the same touch ID to two touch coordinates when a distance between two touch coordinates is smaller than a first threshold value ($D_{tv}$ in FIG. 8 or 9). In addition, when the distance between two touch coordinates is greater than the first threshold value, the T-MCU 160 may assign different touch IDs to two touch coordinates.

Meanwhile, in an exemplary embodiment, the T-MCU 160 may include the following configuration in order to prevent a tracking error of the touch coordinates, which occurs when a distance between touch coordinates corresponding to a drum touch is smaller than the first threshold value.

Figure 3:
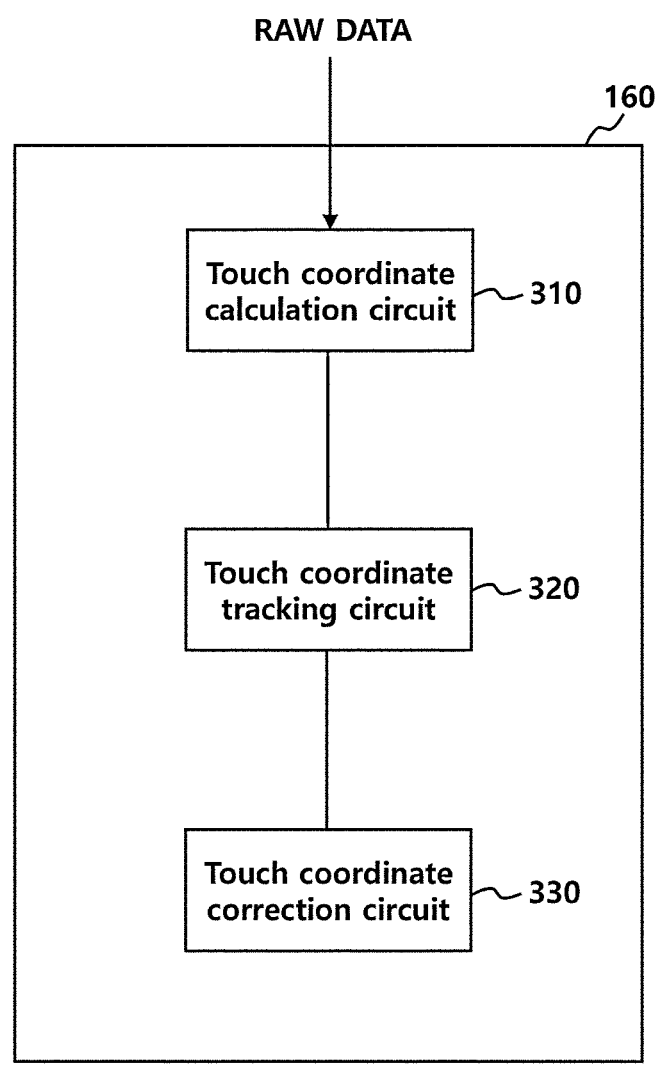
FIGS. 3 and 4 are configuration diagrams of a touch sensing device according to an exemplary embodiment.

FIG. 3 is a configuration diagram of a touch sensing device according to an exemplary embodiment.

Referring to FIG. 3, the touch sensing device may be the T-MCU 160, and the touch sensing device, i.e., the T-MCU 160 may include a touch coordinate calculation circuit 310 and a touch coordinate tracking circuit 320. In addition, the T-MCU 160 may further include a touch coordinate correction circuit 330.

Figure 4:
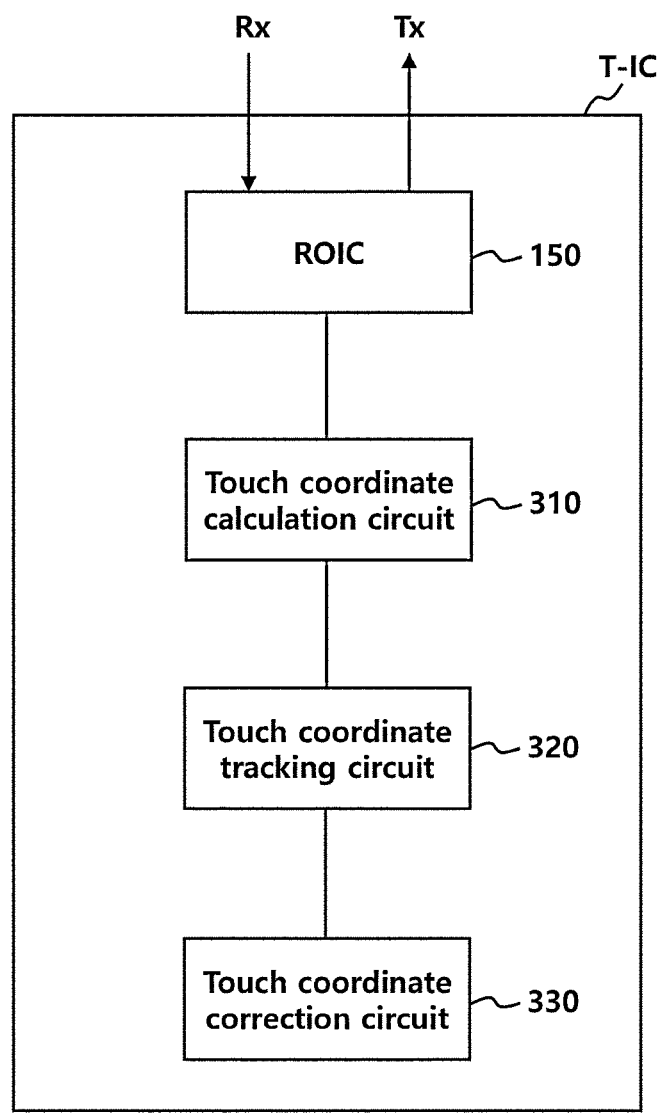

When the touch sensing device includes the ROIC 150 and the T-MCU 160, the touch sensing device may be the T-IC, and the touch sensing device, i.e., the T-IC may further include the ROIC 150 as in FIG. 4.

The touch coordinate calculation circuit 310 may calculate the touch coordinates for the touch input detected from the touch electrodes TE based on the raw data generated by the ROIC 150.

Figure 5:
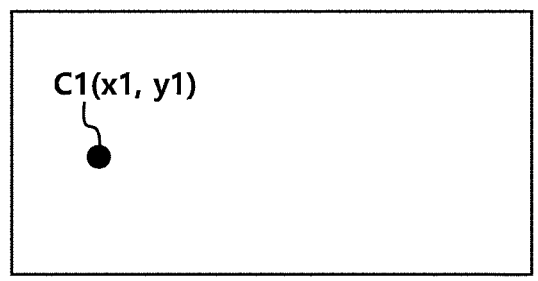
FIG. 5 is a diagram for describing a configuration in which the touch sensing device assigns a touch ID to a touch coordinates according to an exemplary embodiment.
Figure 5:
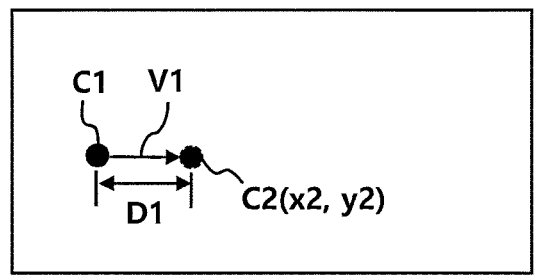
Figure 5:
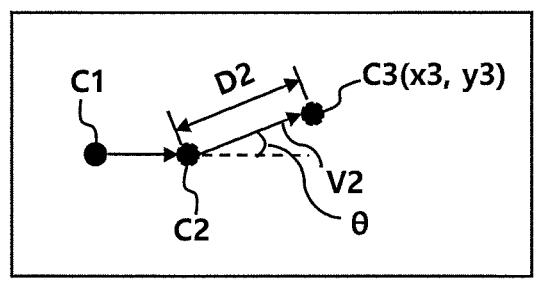

Specifically, the touch coordinate calculation circuit 310 may calculate the first touch coordinates (C1 in FIG. 5) for the touch input detected from the touch electrodes TE at the first time point ($1^{st}$ sensing frame in FIG. 5) and calculate the second touch coordinates (C2 in FIG. 5) for the touch input detected from the touch electrodes TE at a second time point ($2^{nd}$ sensing frame in FIG. 5). In addition, the touch coordinate calculation circuit 310 may calculate a third touch coordinates (C3 in FIG. 5) for the touch input detected from the touch electrodes TE at a third time point ($3^{rd}$ sensing frame in FIG. 5).

Here, the first time point may be a time point when the touch input of the user starts and a time point after the first time point may be the second time point. In addition, a time point after the second time point may be the third time point.

The touch coordinate tracking circuit 320 assigns the first touch ID to the first touch coordinates calculated by the touch coordinate calculation circuit 310. The touch coordinate tracking circuit 320 may output the first touch coordinates and the first touch ID to the touch coordinate correction circuit 330.

When the touch coordinate calculation circuit 310 calculates a second touch coordinate, the touch coordinate tracking circuit 320 may identify a first distance (D1 in FIG. 5) which is a distance between the first touch coordinates and the second touch coordinate.

In addition, the touch coordinate tracking circuit 320 may compare a pre-stored first threshold value and the first distance. Here, the first threshold value may be a reference distance value between coordinates for determining whether to assign the same touch ID to two coordinates.

When the first distance is greater than the first threshold value, the touch coordinate tracking circuit 320 may assign a second touch ID to the second touch coordinates and output the second touch coordinates and the second touch ID to the touch coordinate correction circuit 330. Here, the second touch ID means a touch ID different from the first touch ID.

When the first distance is smaller than the first threshold value, the touch coordinate tracking circuit 320 may assign and store the first touch ID to and in the second touch coordinate. In addition, the touch coordinate tracking circuit 320 may output the first touch coordinates and the first touch ID to the touch coordinate correction circuit 330.

In an exemplary embodiment, the touch coordinate tracking circuit 320 may further store a second threshold value smaller than the first threshold value, and further compare the first distance and the second threshold value. When the first distance is smaller than the second threshold value, the touch coordinate tracking circuit 320 determines the second touch coordinates as a jitter component of the first touch coordinates to remove the second touch coordinate. Here, the jitter component of the first touch coordinates may be generated by high-frequency noise included in the reaction signal Rx or hand trembling.

In an exemplary embodiment, when the touch coordinate calculation circuit 310 does not calculate the third touch coordinates in state in which the first distance is smaller than the first threshold value, i.e., when a distance between the touch coordinates at the first and second time points is smaller than the first threshold value and the touch input of the user is not detected after the first and second time points, the touch coordinate tracking circuit 320 may output the second touch coordinates and the first touch ID to the touch coordinate correction circuit 330.

Here, the state in which the first distance is smaller than the first threshold value may mean a state in which the first distance is greater than the second threshold value and smaller than the first threshold value.

Meanwhile, when the touch coordinate calculation circuit 310 calculates the third touch coordinate, the touch coordinate tracking circuit 320 may identify a second distance (D2 in FIG. 5) which is a distance between the second touch coordinates and the third touch coordinate.

In addition, the touch coordinate tracking circuit 320 may compare the first threshold value and the second distance.

When the second distance is greater than the first threshold value in the state in which the first distance is smaller than the first threshold value, the touch coordinate tracking circuit 320 may assign the second touch ID to the third touch coordinates and output the third touch coordinates and the second touch ID to the touch coordinate correction circuit 330.

When the second distance is also smaller than the first threshold value in the state in which the first distance is smaller than the first threshold value, the touch coordinate tracking circuit 320 may be calculate a first vector (V1 in FIG. 5) for the first touch coordinates and the second touch coordinates and a second vector (V2 in FIG. 5) for the second touch coordinates and the third touch coordinates as in Equations 1 and 2 below. Here, the touch coordinate tracking circuit 320 may omit a process of comparing the second distance and the second threshold value.

$$V1 = (x_2 - x_1, y_2 - y_1) \quad \text{[Equation 1]}$$

$$V2 = (x_3 - x_2, y_3 - y_2) \quad \text{[Equation 2]}$$

Here, $x_1$ means an x-axis coordinates of the first touch coordinate, $y_1$ means a y-axis coordinates of the first touch coordinate, $x_2$ means the x-axis coordinates of the second touch coordinate, $y_2$ means the y-axis coordinates of the second touch coordinate, $x_3$ means the x-axis coordinates of the third touch coordinate, and $y_3$ means the y-axis coordinates of the third touch coordinate.

The touch coordinate tracking circuit 320 may determine the touch ID to be assigned to the third touch coordinates by using the first and second vectors.

In addition, the touch coordinate tracking circuit 320 may assign the determined touch ID to the third touch coordinates and output the touch ID to the touch coordinate correction circuit 330.

Specifically, the touch coordinate tracking circuit 320 may calculate an angle θ between the first vector and the second vector by using Equations 3 and 4 below.

$$V1 \cdot V2 = \quad \text{[Equation 3]}$$
$$(x_2 - x_1) \times (x_3 - x_2) + (y_2 - y_1) \times (y_3 - y_2) = |V1| \times |V2| \times \cos\theta$$

$$\theta = \arccos\left[\frac{(x_2 - x_1) \times (x_3 - x_2) + (y_2 - y_1) \times (y_3 - y_2)}{|V1| \times |V2|}\right] \quad \text{[Equation 4]}$$

Here, V1·V2 means an inner produce of the vector, |V1| means an absolute value of the first vector, |V2| means the absolute value of the second vector, and θ means the angle between the first and second vectors.

The touch coordinate tracking circuit 320 may compare the absolute value of the second vector and the second threshold value, and compare an absolute value |θ| of the angle between the first and second vectors, and a pre-stored threshold value.

When the absolute value of the second vector is greater than the second threshold value and the absolute value of the angle between the first and second vectors is smaller than the third threshold value, the touch coordinate tracking circuit 320 may assign the first touch ID to the third touch coordinate.

Here, assigning the first touch ID to the first touch coordinate, the second touch coordinate, and the third touch coordinates by the touch coordinate tracking circuit 320 may mean that the first touch coordinate, the second touch coordinate, and the third touch coordinates are the touch coordinates corresponding to the drawing touch.

In other words, since the drawing touch is a touch input for the user to draw a line in any one direction as in FIG. 8, the absolute value of the angle between the first and second vectors may be smaller than the threshold value and a movement distance (the absolute value of the second vector) of a user's finger touching the panel 110 may be greater than the second threshold value. In this case, the touch coordinate tracking circuit 320 assigns the first touch ID to the first touch coordinate, the second touch coordinate, and the third touch coordinate.

Meanwhile, when the touch coordinate calculation circuit 310 calculates a fourth touch coordinates for the touch input detected from the touch electrodes at a fourth time point which is a time point after the third time point, the touch coordinate tracking circuit 320 may immediately assign the first touch ID to the fourth touch coordinate.

In other words, the touch coordinate tracking circuit 320 which determines the touch ID to be assigned to the third touch coordinates as the first touch ID may assign the first touch ID equally even to touch coordinates calculated after the third touch coordinate.

In an exemplary embodiment, when the absolute value of the second vector is smaller than the second threshold value, the touch coordinate tracking circuit 320 may assign the second touch ID which is the touch ID different from the first touch ID to the third touch coordinate.

Further, when the absolute value of the angle between the first and second vectors is greater than the third threshold value, the touch coordinate tracking circuit 320 may assign the second touch ID to the third touch coordinate.

In other words, since the drum touch is a touch input in which the user tap-touches a part of the panel 110 several times, the absolute value of the angle between the first and second vectors may be greater than the third threshold value or the absolute value of the distance between the second touch coordinates and the third coordinates or the second vector may be smaller than the second threshold value. In this case, the touch coordinate tracking circuit 320 assigns the second touch ID to the third touch coordinate.

Meanwhile, when the touch coordinate calculation circuit 310 calculates the fourth touch coordinates for the touch input detected from the touch electrodes at the fourth time point which is the time pint after the third time point, the touch coordinate tracking circuit 320 may immediately assign the third touch ID which are different from the first touch ID and the second touch ID to the fourth touch coordinate.

In other words, the touch coordinate tracking circuit 320 which determines the touch ID to be assigned to the third touch coordinates as the second touch ID may assign different touch IDs to the touch coordinates calculated after the third touch coordinate.

The touch coordinate correction circuit 330 may correct the touch coordinates output from the touch coordinate tracking circuit 320 by using a smoothing technique. Here, the smoothing technique may mean a technique that reduces noise in the touch coordinate.

The touch coordinates corrected by the touch coordinate correction circuit 330 and the touch ID assigned to the touch coordinates may be transmitted to the host 30.

As described above, even when the distance between the touch coordinates corresponding to the drum touch is within the first threshold value, the touch sensing device may assign different touch IDs to respective touch coordinates, so it is possible to prevent the tracking error from occurring in the drum touch in which the distance between the touch coordinates is within the first threshold value.

Hereinafter, a process in which the touch sensing device assigns the touch ID to the touch coordinates will be described.

Figure 6:
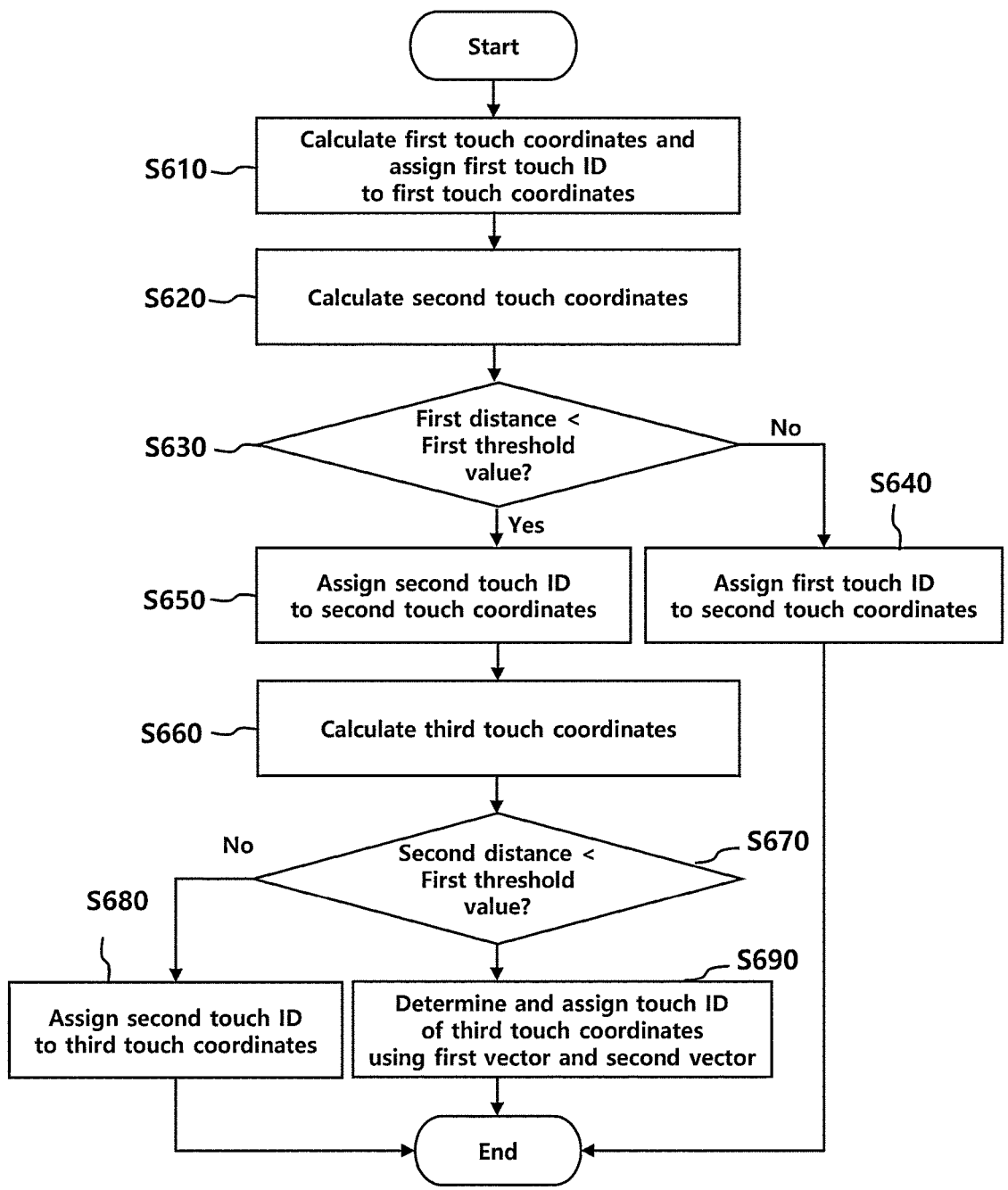
FIG. 6 is a flowchart illustrating a process of assigning a touch ID to a touch coordinates in a touch sensing device according to an exemplary embodiment.

FIG. 6 is a flowchart illustrating a process of assigning a touch ID to a touch coordinates in a touch sensing device according to an exemplary embodiment. Here, the touch sensing device may be the T-MCU 160 or the T-IC including the ROIC 150 and the T-MCU 160.

Referring to FIG. 6, the touch sensing device may calculate the first touch coordinates for the touch input detected from the touch electrodes at the first time point, and assign the first touch ID to the first touch coordinates (S610). Here, the first time point may be a time point when the touch input of the user starts.

The touch sensing device may calculate the second touch coordinates for the touch input detected from the touch electrodes at the second time point (S620). Here, the second time point may be a time point immediately after the first time point.

The touch sensing device identifies the first distance which is the distance between the first touch coordinates and the second touch coordinates and when the first distance is greater than the first threshold value, the touch sensing device may assign the second touch ID to the second touch coordinates and terminate the process of FIG. 6 (S630 and S640). Here, the first threshold value may be a reference distance value between coordinates for determining whether to assign the same touch ID to two coordinates.

When the first distance is smaller than the first threshold value in step S630 above, the touch sensing device may assign the first touch ID to the second touch coordinates (S640). The touch sensing device may further compare the first distance and the second threshold value in step S650 above, and when the first distance is greater than the second threshold value and smaller than the first threshold value, the touch sensing device may assign the first touch ID to the second touch coordinate.

The touch sensing device may calculate the third touch coordinates for the touch input detected from the touch electrodes at the third time point (S660).

The touch sensing device identifies the second distance which is the distance between the second touch coordinates and the third touch coordinates and when the second distance is greater than the first threshold value, the touch sensing device may assign the second touch ID to the third touch coordinates and terminate the process of FIG. 6 (S670 and S680).

When the second distance is smaller than the first threshold value in step S670 above, the touch sensing device may determine the touch ID to be assigned to the third touch coordinates by using the first vector for the first and second touch coordinates and the second vector for the second and third touch coordinates, and assign the determined touch ID to the third touch coordinates (S690).

After step S610 above, the touch sensing device may transmit the first touch coordinates and the first touch ID to the host 30.

After step S640 above, the touch sensing device may transmit the second touch coordinates and the second touch ID to the host 30.

After step S650 above, the touch sensing device may store the second touch coordinates, and transmit the first touch coordinates and the first touch ID to the host 30 instead of the second touch coordinates.

After step S680 above, the touch sensing device may transmit the third touch coordinates and the second touch ID to the host 30.

Meanwhile, a specific process for step S690 above is as follows.

Figure 7:
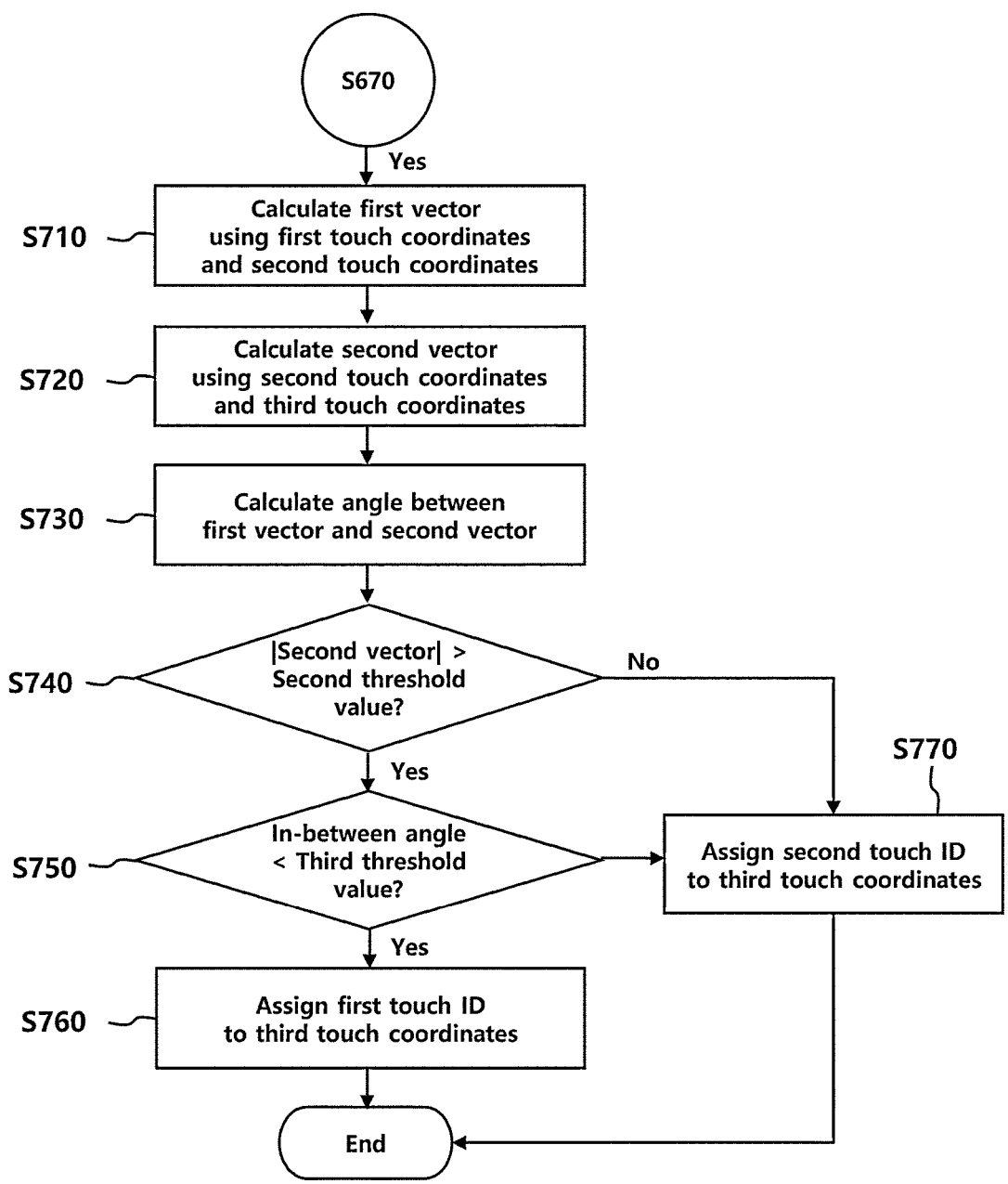
FIG. 7 is a flowchart illustrating a process of assigning a touch ID to a third touch coordinates in a touch sensing device according to an exemplary embodiment.

FIG. 7 is a flowchart illustrating a process of assigning a touch ID to a third touch coordinates in a touch sensing device according to an exemplary embodiment.

Referring to FIG. 7, the touch sensing device may calculate the first vector by using the first and second touch coordinates (S710).

In addition, the touch sensing device may calculate the second vector by using the second and third touch coordinates (S720).

The touch sensing device may calculate the angle between the first and second vectors by using the inner product of the first and second vectors (S730).

The touch sensing device may compare the absolute value of the second vector and the second threshold value, and compare the absolute value of the angle between the first and second vectors, and the third threshold value (S740 and S750).

When the absolute value of the second vector is greater than the second threshold value in step S740 above and the absolute value of the angle between the first and second vectors is smaller than the third threshold value in step S750 above, the touch sensing device may assign the first touch ID to the third touch coordinates (S760).

When the absolute value of the second vector is smaller than the second threshold value in step S740 above and the absolute value of the angle between the first and second vectors is greater than the third threshold value in step S750 above, the touch sensing device may assign the second touch ID to the third touch coordinates (S770).

After step S760 above, the touch sensing device may transmit the third touch coordinates and the first touch ID to the host 30.

After step S770 above, the touch sensing device may transmit the third touch coordinates and the second touch ID to the host 30.

After step S760 above, the touch sensing device may calculate the fourth touch coordinates for the touch input detected from the touch electrodes at the fourth time point.

The touch sensing device may unconditionally assign the first touch ID to the fourth touch coordinate.

The touch sensing device may identify the third distance which is the distance between the third and fourth touch coordinates, and compares the third distance and the first threshold value, and only when the third distance is smaller than the first threshold value, the touch sensing device may also assign the first touch ID to the fourth touch coordinate.

When the third distance is greater than the first threshold value, the touch sensing device may assign the second touch ID to the fourth touch coordinate.

After step S770 above, the touch sensing device may calculate the fourth touch coordinates for the touch input detected from the touch electrodes at the fourth time point.

In addition, the touch sensing device may assign the third touch ID to the fourth touch coordinate.

What is claimed is:

1. A touch sensing device comprising:
   a touch coordinate calculation circuit to calculate first touch coordinates for a touch input detected by touch electrodes at a first time point, to calculate second touch coordinates for a touch input detected by touch electrodes at a second time point, and to calculate third touch coordinates for a touch input detected by touch electrodes at a third time point; and
   a touch coordinate tracking circuit to assign a first touch ID to the first touch coordinates, to identify a first distance which is a distance between the first touch coordinate and the second touch coordinate, to assign the first touch ID to the second touch coordinates as well when the first distance is smaller than a first threshold value, to identify a second distance which is a distance between the second touch coordinates and the third touch coordinates, to determine a touch ID to be assigned to the third touch coordinates by using a first vector for the first and second touch coordinates and a second vector for the second and third touch coordinates when the second distance is smaller than the first threshold value, and to assign the determined touch ID to the third touch coordinates.

2. The touch sensing device of claim 1, wherein the touch coordinate tracking circuit determines the second touch coordinates as a jitter component of the first touch coordinates and removes the second touch coordinates when the first distance is smaller than a second threshold value, which is smaller than the first threshold value, and assigns the first touch ID to the second touch coordinates when the first distance is greater than the second threshold value.

3. The touch sensing device of claim 1, wherein the touch coordinate tracking circuit assigns the first touch ID to the third touch coordinates when an absolute value of the second vector is greater than a second threshold value, which is smaller than the first threshold value, and an absolute value of an angle between the first and second vectors is smaller than a third threshold value.

4. The touch sensing device of claim 3, wherein, when the absolute value of the second vector is smaller than the second threshold value, the touch coordinate tracking circuit assigns a second touch ID, which is different from the first touch ID, to the third touch coordinates.

5. The touch sensing device of claim 3, wherein, when the absolute value of the angle between the first and second vectors is greater than the third threshold value, the touch coordinate tracking circuit assigns a second touch ID, which is different from the first touch ID, to the third touch coordinates.

6. The touch sensing device of claim 1, further comprising:
   a touch coordinate correction circuit to correct touch coordinates by using a smoothing technique,
   wherein the touch coordinate calculation circuit assigns the first touch ID to the first touch coordinates, and then, outputs the first touch coordinates and the first touch ID to the touch coordinate correction circuit; and assigns the first touch ID to the second touch coordinate, and then, outputs the first touch coordinates, instead of the second touch coordinates, and the first touch ID to the touch coordinate correction circuit.

7. A touch sensing method comprising:
   calculating first touch coordinates for a touch input detected by touch electrodes at a first time point and assigning a first touch ID to the first touch coordinates;
   calculating second touch coordinates for a touch input detected by the touch electrodes at a second time point and identifying a first distance which is a distance between the first touch coordinates and the second touch coordinates;
   assigning the first touch ID to the second touch coordinates as well when the first distance is smaller than the first threshold value by comparing the first distance and a first threshold value;
   calculating third touch coordinates for a touch input detected by the touch electrodes at a third time point and identifying a second distance which is a distance between the second touch coordinates and the third touch coordinates; and
   determining a touch ID to be assigned to the third touch coordinates by using a first vector for the first and second touch coordinates and a second vector for the second and third touch coordinates when the second distance is smaller than the first threshold value by comparing the second distance and the first threshold value and assigning the determined touch ID to the third touch coordinates.

8. The touch sensing method of claim 7, wherein assigning the touch ID to the third touch coordinates comprises
   when the second distance is smaller than the first threshold value by comparing the second distance and the first threshold value, calculating the first vector by using the first touch coordinates and the second touch coordinates and calculating the second vector by using the second touch coordinates and the third touch coordinates;
   calculating an angle between the first vector and the second vector by using an inner product of the first and second vectors;
   comparing a second threshold value, which is smaller than the first threshold value, and an absolute value of the second vector and comparing an absolute value of the angle between the first and second vectors and a third threshold value; and
   when the absolute value of the second vector is greater than the second threshold value and the absolute value of the angle between the first and second vectors is smaller than the third threshold value, assigning the first touch ID to the third touch coordinates.

9. The touch sensing method of claim 8, further comprising,
   after assigning the first touch ID to the third touch coordinates,
   transmitting the third touch coordinates and the first touch ID to a host.

10. The touch sensing method of claim 8, wherein assigning the first touch ID to the third touch coordinates further comprises,
    when the absolute value of the second vector is smaller than the second threshold value or the absolute value of the angle between the first and second vectors is greater than the third threshold value, assigning a second touch ID, which is different from the first touch ID, to the third touch coordinates.

11. The touch sensing method of claim 10, further comprising,
    after assigning the second touch ID to the third touch coordinates, transmitting the third touch coordinates and the second touch ID to a host.

12. The touch sensing method of claim 7, wherein, in assigning the first touch ID to the second touch coordinate as well,
the touch sensing device further compares a second threshold value, which is smaller than the first threshold value, and the first distance when the first distance is smaller than the first threshold value; and assigns the first touch ID to the second touch coordinates as well when the first distance is smaller than the first threshold value and greater than the second threshold value.

\* \* \* \* \*